(12) United States Patent
Kobayashi

(10) Patent No.: US 11,863,101 B2
(45) Date of Patent: Jan. 2, 2024

(54) DRIVING APPARATUS AND AIR-CONDITIONING APPARATUS

(71) Applicant: Mitsubishi Electric Corporation, Tokyo (JP)

(72) Inventor: Takahiko Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 344 days.

(21) Appl. No.: 17/427,286

(22) PCT Filed: Mar. 28, 2019

(86) PCT No.: PCT/JP2019/013747
§ 371 (c)(1),
(2) Date: Jul. 30, 2021

(87) PCT Pub. No.: WO2020/194695
PCT Pub. Date: Oct. 1, 2020

(65) Prior Publication Data
US 2022/0115974 A1    Apr. 14, 2022

(51) Int. Cl.
*H02P 29/66* (2016.01)
*H02P 29/024* (2016.01)
(Continued)

(52) U.S. Cl.
CPC .......... *H02P 29/027* (2013.01); *F25B 31/026* (2013.01); *H02M 1/0009* (2021.05);
(Continued)

(58) Field of Classification Search
USPC .................................................. 318/400.22
See application file for complete search history.

(56) References Cited

U.S. PATENT DOCUMENTS

| 9,653,906 B2 | 5/2017 | Sakanobe et al. |
| 2006/0119299 A1* | 6/2006 | Nishijima ............... H02K 1/276 318/400.42 |

(Continued)

FOREIGN PATENT DOCUMENTS

| JP | 2009-189181 A | 8/2009 |
| JP | 5377500 B2 | 12/2013 |

(Continued)

OTHER PUBLICATIONS

International Search Report of the International Searching Authority dated May 28, 2019, for the corresponding International application No. PCT/JP2019/013747.

*Primary Examiner* — Kawing Chan
*Assistant Examiner* — Gabriel Agared
(74) *Attorney, Agent, or Firm* — POSZ LAW GROUP, PLC

(57) ABSTRACT

A driving apparatus includes: an inverter unit generating a three-phase alternating-current voltage from a direct-current voltage in accordance with a drive signal based on a voltage command and outputting the three-phase alternating-current voltage to a permanent-magnet motor, the permanent-magnet motor including a permanent magnet; a current detection unit detecting a motor current flowing through the permanent-magnet motor; and a control unit generating the voltage command to control an operation of the inverter unit and estimating a temperature of the permanent magnet to perform a protection operation on the inverter unit on the basis of the motor current and an overcurrent protection threshold. The control unit sets the overcurrent protection threshold on the basis of a magnet temperature estimated value of the permanent magnet and any one of a control computation period of the control unit, an output voltage frequency of the (Continued)

inverter unit, and a carrier frequency based on the output voltage frequency of the inverter unit.

9 Claims, 9 Drawing Sheets

(51) Int. Cl.
    *H02P 29/60*     (2016.01)
    *H02M 1/00*     (2006.01)
    *F25B 31/02*     (2006.01)
    *H02M 1/32*     (2007.01)
    *H02M 7/5387*     (2007.01)
    *H02P 27/08*     (2006.01)

(52) U.S. Cl.
    CPC ......... *H02M 1/32* (2013.01); *H02M 7/53871* (2013.01); *H02P 27/08* (2013.01); *H02P 29/60* (2016.02); *F25B 2500/08* (2013.01)

(56) References Cited

U.S. PATENT DOCUMENTS

| | | | |
|---|---|---|---|
| 2010/0064706 A1* | 3/2010 | Hattori | H02M 1/32 62/157 |
| 2011/0157752 A1 | 6/2011 | Sakanobe et al. | |
| 2011/0193506 A1* | 8/2011 | Hayashi | H02P 6/28 318/400.12 |
| 2014/0333240 A1* | 11/2014 | Kobayashi | H02P 29/662 318/400.02 |
| 2018/0131308 A1* | 5/2018 | Kashima | H02P 6/20 |
| 2019/0245472 A1* | 8/2019 | Toyodome | H02P 6/28 |

FOREIGN PATENT DOCUMENTS

| | | |
|---|---|---|
| JP | 5788057 B1 | 9/2015 |
| JP | 2016-220302 A | 12/2016 |

\* cited by examiner

DRIVING APPARATUS AND AIR-CONDITIONING APPARATUS

CROSS REFERENCE TO RELATED APPLICATION

This application is a U.S. national stage application of International Patent Application No. PCT/JP2019/013747 filed on Mar. 28, 2019, the disclosure of which is incorporated herein by reference.

TECHNICAL FIELD

The present invention relates to a driving apparatus that drives a permanent-magnet motor and an air-conditioning apparatus.

BACKGROUND

When a driving apparatus drives a permanent-magnet motor, magnetic flux of a permanent magnet decreases with a temperature change due to, for example, energization of the winding of the permanent-magnet motor. Such a phenomenon in which the magnetic fluxes decrease is called demagnetization. Under a condition that goes beyond the allowable condition, a phenomenon called irreversible demagnetization occurs where the fluxes do not return to a pre-demagnetization state. Demagnetization includes high-temperature demagnetization in which demagnetization occurs as temperature increases, and low-temperature demagnetization in which demagnetization occurs as temperature decreases in contrast the high-temperature demagnetization. Whether a permanent magnet has a characteristic of the high-temperature demagnetization or a characteristic of the low-temperature demagnetization depends on the material of that magnet. When driving the permanent-magnet motor, the driving apparatus needs to keep the permanent-magnet motor under a condition that prevents occurrence of irreversible demagnetization of the permanent magnet regardless of the characteristic.

The allowable condition that prevents the occurrence of the irreversible demagnetization also depends on a motor current. In order that the motor current does not exceed a demagnetizing current that is a current value at which irreversible demagnetization occurs, it is necessary to set an overcurrent protection threshold having a margin relative to the demagnetizing current. There is a method of setting an overcurrent protection threshold, referring to a minimum demagnetizing current within an expected temperature range during operation of a permanent-magnet motor. There is a method of correcting an overcurrent protection threshold on the basis of a magnet temperature detected by a temperature sensor that detects a temperature of a magnet included in a permanent-magnet motor (see, for example, Patent Literature 1).

Patent Literature

Patent Literature 1: Japanese Patent No. 5377500

When an overcurrent protection threshold is set referring to the minimum demagnetizing current within an expected temperature range during the operation of the permanent-magnet motor, the overcurrent protection threshold thus set will have an excess margin for protection depending on a temperature zone, specifically, a low-temperature zone in a case of high-temperature demagnetization or a high-temperature zone in a case of low-temperature demagnetization.

In such a case, output performance of the permanent-magnet motor is unnecessarily limited, which is problematic.

The technique described in Patent Literature 1 is premised on using so-called hardware such as a temperature sensor for detecting a magnet temperature, and a current detection circuit, to achieve demagnetization protection. The use of the hardware configuration for detecting a magnet temperature with a temperature sensor directly attached to a permanent magnet inside a permanent-magnet motor and providing an overcurrent protection threshold sequentially variable in correspondence to the magnet temperature makes the device and circuit configuration complicated, which results in increase in the size and cost.

The scheme to protect the permanent magnet from the demagnetization can be also achieved by not the hardware, but software processing that detects a motor current flowing through a permanent-magnet motor and takes the detected motor current into a control unit which is a component of a driving apparatus. To achieve the protection from the demagnetization through the software processing, the detected current detection is intermittently compared with an overcurrent protection threshold evert calculation period to determine whether protection from the demagnetization is needed. In this case, a determination interval is prolonged as the operation period is prolonged, which poses a problem of failure to adapt to a rapid change in the motor current. The calculation period is often determined in correspondence to a carrier frequency of an inverter unit. The problem is marked where a synchronous pulse width modulation (PWM) mode that provides a carrier frequency variable in correspondence to an output voltage frequency of an inverter unit and sequentially changes a calculation period accordingly applies in order to drive the permanent-magnet motor at a high speed.

SUMMARY

The present invention has been made in view of the above, and an object thereof is to obtain a driving apparatus capable of reducing a decrease in output performance and preventing the demagnetization of the permanent magnet due to the overcurrent.

To solve the above problem and achieve the object, a driving apparatus according to the present invention comprises: an inverter unit generating a three-phase alternating-current voltage from a direct-current voltage in accordance with a drive signal based on a voltage command and outputting the three-phase alternating-current voltage to a permanent-magnet motor, the permanent-magnet motor comprising a permanent magnet; a current detection unit detecting a motor current flowing through the permanent-magnet motor; and a control unit generating the voltage command to control an operation of the inverter unit and estimating a temperature of the permanent magnet to perform a protection operation on the inverter unit on a basis of the motor current and an overcurrent protection threshold. The control unit sets the overcurrent protection threshold on a basis of a magnet temperature estimated value of the permanent magnet and any one of a control computation period of the control unit, an output voltage frequency of the inverter unit, and a carrier frequency based on the output voltage frequency of the inverter unit.

The driving apparatus according to the present invention achieves an effect that it is possible to reduce the decrease in output performance and to prevent demagnetization of the permanent magnet due to the overcurrent.

DETAILED DESCRIPTION

Hereinafter, a driving apparatus and an air-conditioning apparatus according to each embodiment of the present invention will be described in detail with reference to the drawings. The present invention is not limited to the embodiments.

First Embodiment

Figure 1:
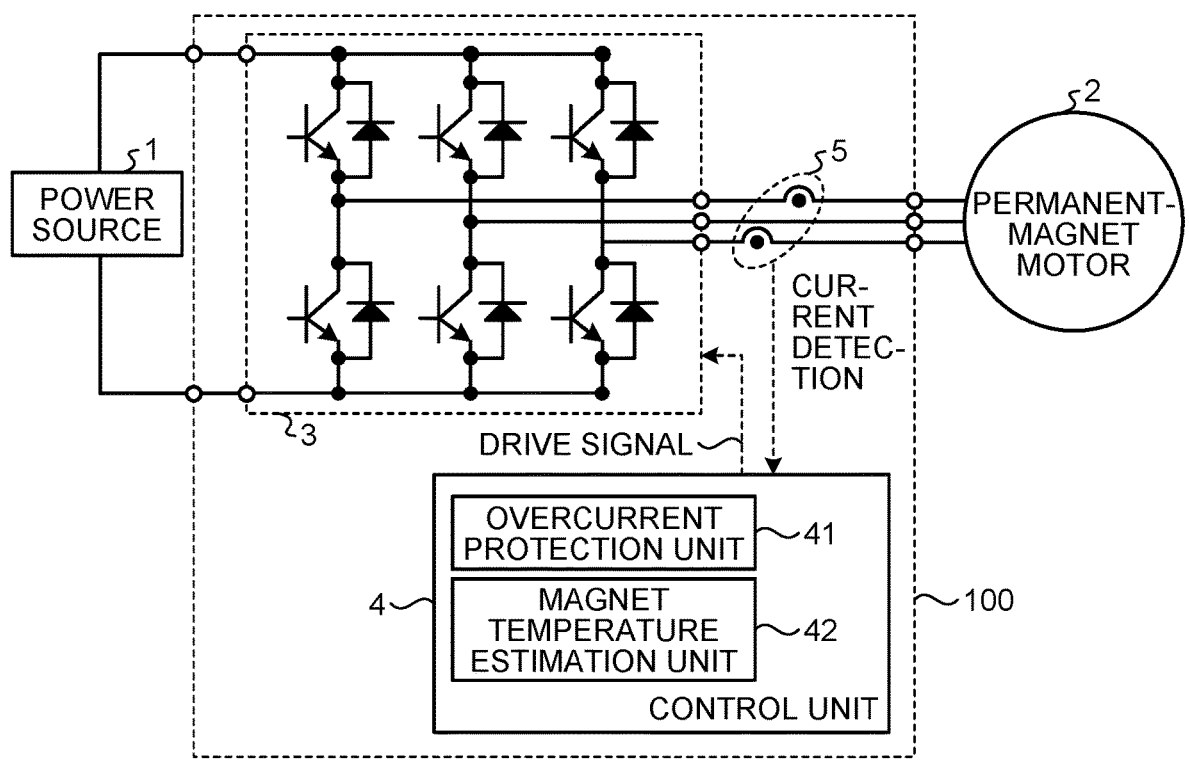
FIG. 1 is a diagram illustrating an example configuration of a driving apparatus according to a first embodiment.

FIG. 1 is a diagram illustrating an example configuration of a driving apparatus 100 according to a first embodiment of the present invention. The driving apparatus 100 is connected to a power source 1 and a permanent-magnet motor 2. The driving apparatus 100 includes an inverter unit 3 that drives the permanent-magnet motor 2, a control unit 4 that controls the inverter unit 3, and a current detection unit 5 that detects a motor current flowing through the winding of the permanent-magnet motor 2.

Figure 2:
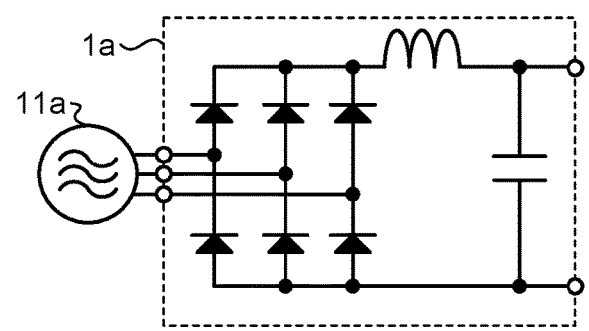
FIG. 2 is a diagram illustrating an example of a power source connected to the driving apparatus according to the first embodiment.
Figure 3:
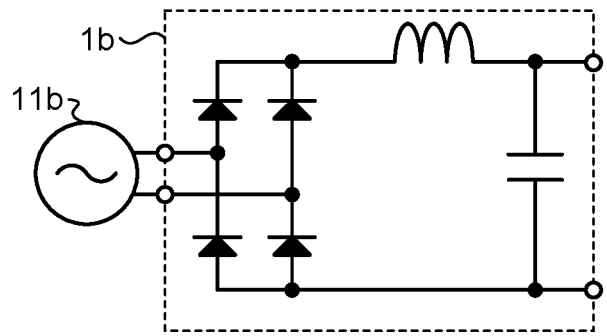
FIG. 3 is a diagram illustrating another example of the power source connected to the driving apparatus according to the first embodiment.

The power source 1 may be a direct-current power supply including a cell, a battery, and the like, or may be an alternating-current-to-direct-current power converter including a known converter that converts an alternating-current voltage into a direct-current voltage. FIG. 2 is a diagram illustrating an example of the power source 1 connected to the driving apparatus 100 according to the first embodiment. As illustrated in FIG. 2, the power source 1 may be an alternating-current-to-direct-current power converter 1a including a known converter that converts an alternating-current voltage supplied from a three-phase alternating-current power supply 11a, into a direct-current voltage. FIG. 3 is a diagram illustrating another example of the power source 1 connected to the driving apparatus 100 according to the first embodiment. As illustrated in FIG. 3, the power source 1 may be an alternating-current-to-direct-current power converter 1b including a known converter that converts an alternating-current voltage supplied from a single-phase alternating-current power supply 11b, into a direct-current voltage. Although not illustrated, a booster circuit such as a well-known direct current (DC)-to-DC converter may be inserted into a direct-current bus between each of the alternating-current-to-direct-current power converters 1a and 1b and the inverter unit 3 to boost a direct-current voltage.

The permanent-magnet motor 2 is a motor including a permanent magnet. The permanent-magnet motor 2 is connected to the inverter unit 3 of the driving apparatus 100.

The inverter unit 3 converts a direct-current voltage supplied from the power source 1 into a three-phase alternating-current voltage for driving the permanent-magnet motor 2 at a desired frequency, that is, rotational speed, in accordance with a PWM signal for each phase. The PWM signal is a drive signal generated on the basis of a voltage command in the control unit 4. The inverter unit 3 applies the three-phase alternating-current voltage to the permanent-magnet motor 2. That is, the inverter unit 3 generates the three-phase alternating-current voltage from the direct-current voltage supplied from the power source 1. The inverter unit 3 drives the permanent-magnet motor 2 in accordance with the drive signal from the control unit 4. The inverter unit 3 includes six switching elements and six feedback diodes. The inverter unit 3 includes two switching elements connected in series to each other on a phase-by-phase basis, and a feedback diode connected in anti-parallel to each switching element. The inverter unit 3 is a known three-phase inverter that drives a general three-phase motor, and each switching element thereof performs a switching operation in accordance with a PWM signal for the corresponding phase. The switching element and the feedback diode may be an element including silicon, or an element including silicon carbide, gallium nitride, diamond, or the like, which is a wide bandgap semiconductor with high withstand voltage and capable of high-temperature operation.

The current detection unit 5 detects a motor current flowing through the permanent-magnet motor 2. The current detection unit 5 may be a known current sensor such as an alternating-current current transformer (ACCT) or a direct-current current transformer (DCCT) provided on wiring connected to the winding of the permanent-magnet motor 2. Alternatively, the current detection unit 5 may be a known shunt resistor for phase current detection inserted in a bus connected to the power source 1 or switching elements on a negative side of the inverter unit 3.

The control unit 4 generates a voltage command to control an operation of the inverter unit 3. The control unit 4 includes an overcurrent protection unit 41 and a magnet temperature estimation unit 42. The overcurrent protection unit 41 performs a protection operation on the inverter unit 3 on the basis of a motor current flowing through the winding of the permanent-magnet motor 2 detected by the current detection unit 5 and an overcurrent protection threshold Ilim set by a method as described later. The magnet temperature estimation unit 42 estimates a magnet temperature Tmag of the permanent magnet of the permanent-magnet motor 2. Although the present embodiment employs a configuration in which the overcurrent protection unit 41 and the magnet temperature estimation unit 42 are included in the control unit 4, this is merely an example, and there is no limitation thereto. A configuration may be employed in which each component individually performs processing independently with a processor such as a microcomputer, and the control unit 4, the overcurrent protection unit 41, and the magnet temperature estimation unit 42 cooperate with one another only for signals necessary to perform the protection operation.

Next, an operation of the driving apparatus 100 will be described. The control unit 4 generates a three-phase alternating-current voltage command necessary for driving the permanent-magnet motor 2 at a desired frequency, that is, at a desired rotational speed. Specifically, the control unit 4 executes well-known control computation such as feedforward control computation and vector control computation with a processor such as a microcomputer for each control computation period $\Delta t$ in the control unit 4, and generates a three-phase alternating-current voltage command of a desired frequency. Hereinafter, the desired frequency is defined as an output voltage frequency finv of the inverter unit 3. Although not illustrated, in these control computations, the control unit 4 may use a motor current flowing through the winding of the permanent-magnet motor 2 detected by the current detection unit 5, or may use information on a position or a speed detected by a position sensor or a speed sensor attached to the permanent-magnet motor 2.

Furthermore, the control unit 4 generates a carrier wave having a carrier frequency fc. The carrier frequency is a predetermined frequency or a frequency calculated on the basis of the output voltage frequency finv of the inverter unit 3. That is, the control unit 4 sets the carrier frequency fc to a constant value or to a positive integral multiple of the output voltage frequency finv of the inverter unit 3. The control unit 4 converts the three-phase alternating-current voltage command into a modulated wave, generates a PWM signal for each phase, which is a drive signal for the inverter unit 3, on the basis of a result of magnitude comparison between the carrier wave and the modulated wave, and outputs the PWM signal to the inverter unit 3.

There are modes called an asynchronous PWM mode and a synchronous PWM mode for generating the carrier wave in the control unit 4. The former is a mode in which the carrier frequency fc is set independently of the output voltage frequency finv, and the latter is a mode in which the carrier frequency fc is set to M times the absolute value of the output voltage frequency finv. Note that M as a parameter is a positive integer, and a multiple of 3 is mainly used as M.

Figure 4:
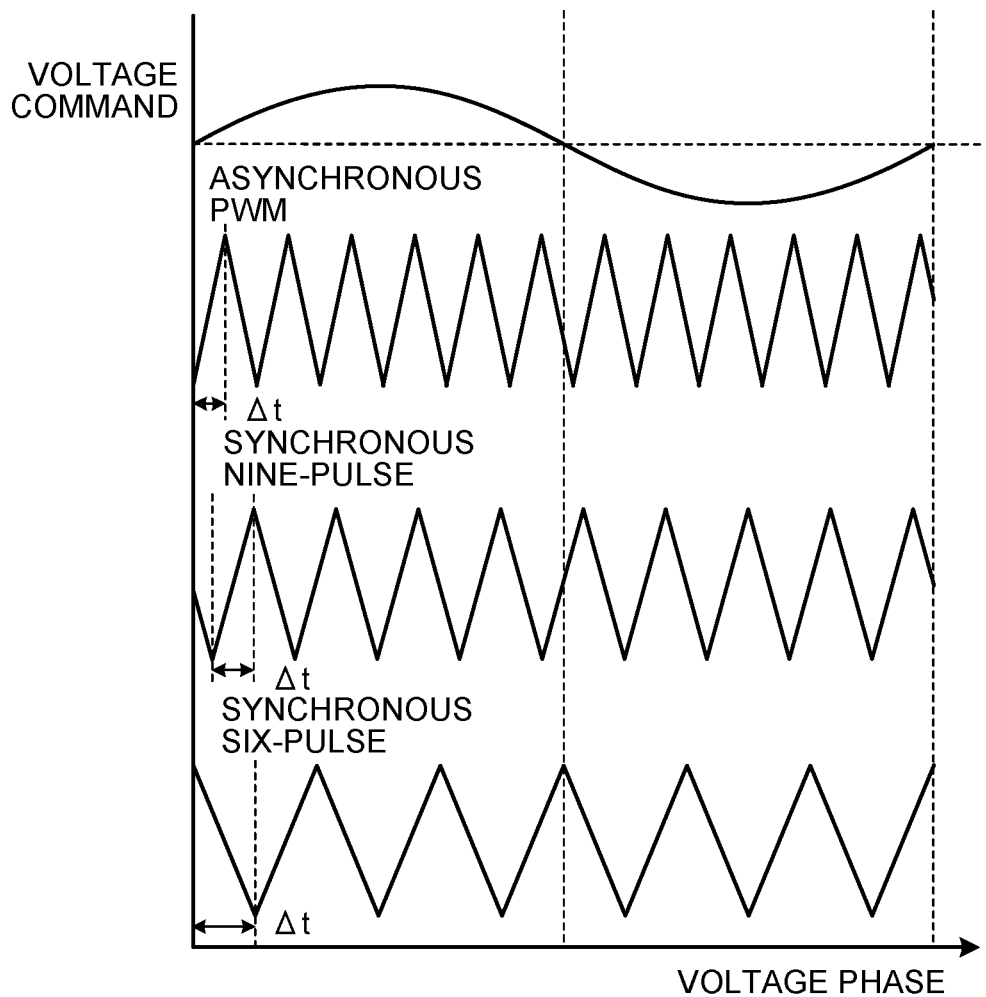
FIG. 4 is a diagram illustrating examples of a carrier wave generation mode in a control unit according to the first embodiment.

FIG. 4 is a diagram illustrating examples of a carrier wave generation mode in the control unit 4 according to the first embodiment. Specifically, FIG. 4 is a diagram illustrating an example of a relationship among a voltage phase of a voltage command, a carrier wave in the asynchronous PWM mode, a carrier wave of M=9, that is, a synchronous nine-pulse carrier wave in the synchronous PWM mode, and a carrier wave of M=6, that is, a synchronous six-pulse carrier wave in the synchronous PWM mode. Illustrated in a first stage of FIG. 4 is the voltage command. Illustrated in second to fourth stages of FIG. 4 are the carrier waves.

For the asynchronous PWM mode, generally, a value of fc/finv is empirically set to approximately 9 or more, i.e., fc/finv≥9 in order to maintain the symmetry of the waveform of the three-phase alternating-current voltage output from the inverter unit 3 to reduce the deterioration of the driving performance due to distortion in the waveform of the voltage. The ratio fc/finv is a ratio between the carrier frequency fc and the output voltage frequency finv. In addition, since there is also an upper limit of the carrier frequency fc due to constraints such as loss and heat generation accompanying switching operations of the switching elements of the inverter unit 3, there is also an upper limit of the output voltage frequency finv in order to maintain the relationship of fc/finv≥9.

For the synchronous PWM mode, on the other hand, the value of fc/finv is a positive integer M, and even if fc/finv≤9 is satisfied, the symmetry of the waveform of the three-phase alternating-current voltage output from the inverter unit 3 is maintained. The synchronous PWM mode makes it possible to set a higher maximum value of the output voltage frequency finv than that in the asynchronous PWM mode even under the constraint on the upper limit of the carrier frequency fc, and achieve the driving even in a high speed zone where the driving is difficult in the asynchronous PWM mode.

It is noted that the carrier frequency fc constantly changes depending on set values of the output voltage frequency finv and the positive integer M. In order to stably output the three-phase alternating-current voltage from the inverter unit 3, there is also a lower limit of the carrier frequency fc. In an actual operation, thus, generally, the asynchronous PWM mode is switched to the synchronous PWM mode or vice versa, and the carrier frequency fc in the asynchronous PWM mode and the positive integer M in the synchronous PWM mode are set to appropriate values, for example, in correspondence to the output voltage frequency finv. The present embodiment is based on the assumption that the control unit 4 performs such operations as switching the PWM mode, and the positive integer M.

Figure 5:
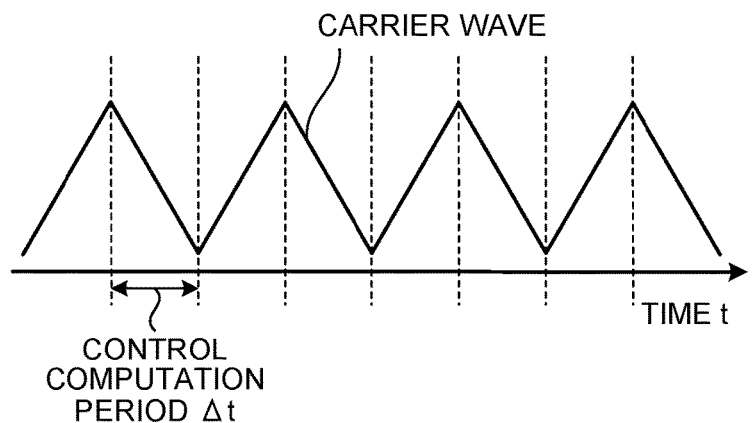
FIG. 5 is a diagram illustrating an example of a relationship between a carrier wave and a control computation period of the control unit according to the first embodiment.

FIG. 5 is a diagram illustrating an example of a relationship between the carrier wave and the control computation period $\Delta t$ of the control unit 4 according to the first embodiment. The current detection unit 5 detects the motor current flowing through the winding of the permanent-magnet motor 2 at each of positive and negative maximum amplitude time points of the carrier wave, and outputs a detection value to the control unit 4. The control unit 4 performs control computation for driving the permanent-magnet motor 2 on the basis of a current value detected by the current detection unit 5, and compares the carrier wave with an instantaneous value of the voltage command for each phase obtained as a result of the control computation. The control unit 4 generates a PWM signal for each phase, which is a drive signal for the inverter unit 3, on the basis of a result of the comparison, and performs a protection operation on the inverter unit 3.

The positive and negative maximum amplitude time points of the carrier wave illustrated in FIG. 5 correspond to a half period of the carrier wave. In addition, the positive and negative maximum amplitude time points are timings at which the switching operations of the switching elements of the inverter unit 3 are performed and the motor current flowing through the winding of the permanent-magnet motor 2 pulsates. Such timings are constantly away from intersections of the carrier wave and the modulated wave. The current detection unit 5 can detect the motor current without being affected by the pulsation of the motor current at each of the positive and negative maximum amplitude time points of the carrier wave illustrated in FIG. 5. It is desirable for the control unit 4 to execute the control computation synchronizing the control computation period with a period of the carrier wave or a period which is an integral multiple of the period of the carrier wave. Alternatively, the control unit 4 desirably executes the control computation synchronizing the control computation period with a half period of the carrier wave or a period which is an integral multiple of the half period of the carrier wave. This makes it possible for the control unit 4 to use the current value detected by the current detection unit 5, without being affected by the pulsation of the motor current.

Consequently, the control unit 4 sets, on the basis of the carrier frequency fc, the control computation period Δt so that Δt=N/(2×fc) holds true in order to execute the control computation synchronizing the control computation period Δt with a period that is N/2 times the period of the carrier wave, that is, a period that is N times the half period of the carrier wave. That is, the control unit 4 sets the control computation period Δt to a positive integral multiple of a half of the carrier frequency fc. Note that N as a parameter is a positive integer. The control unit 4 executes the control computation every control computation period Δt. Thus, the control computation period Δt is a function of the carrier frequency fc, i.e., Δt=f(fc). That is, the control unit 4 sets the control computation period Δt in correspondence to the change in the carrier frequency fc. FIG. 4 also illustrates the relationship between the carrier wave and the voltage command to the inverter unit 3 in each of the PWM modes, and the length of the control computation period Δt varies depending on the PWM modes.

FIG. 5 illustrates a relationship between the period of the carrier wave and the control computation period Δt in the case of N=1. It is noted that N is not necessarily limited to 1 (N=1), and a positive integer other than 1 may be selected as N, for example, N=2, 3, . . . may be selected. When the carrier frequency fc of the carrier wave is very high and the positive integer N is set to 1, the control unit 4 can fail to complete a process of the control computation within the set control computation period Δt, and the overflow can occur. When the carrier frequency fc is low and the value of the positive integer N is set to be large, the control computation period Δt may be so long that a desired control response may not be obtained. For these reasons, the control computation period Δt, that is, the positive integer N, is set on the basis of the carrier frequency fc in view of, for example, a processing load on the control computation, performance of the control unit 4, and a control response required as a system.

Next, an operation of the overcurrent protection unit 41, which is a feature of the present embodiment, will be described. The overcurrent protection unit 41 determines whether there is an anomaly in an output current on the basis of the motor current flowing through the winding of the permanent-magnet motor 2 detected by the current detection unit 5, and performs a protection operation on the inverter unit 3.

The motor current flowing through the winding of the permanent-magnet motor 2 is detected by the current detection unit 5 every control computation period Δt in synchronization with one or both of the positive and negative maximum amplitude time points of the carrier wave. The overcurrent protection unit 41 compares an absolute value of the current value detected by the current detection unit 5 with the overcurrent protection threshold Ilim set by a method described later. When the absolute value of the detected current value exceeds the overcurrent protection threshold Ilim, the overcurrent protection unit 41 determines that there is an anomaly. Desirably, the overcurrent protection unit 41 performs a series of operations from the current detection operation to the anomaly determination operation described above on a phase-by-phase basis, and performs the following protection operation on the inverter unit 3 when it is determined that there is an anomaly in any phase.

As an example of the protection operation for the inverter unit 3, the overcurrent protection unit 41 stops all the outputs of the PWM signals for the individual phases, which are drive signals for the inverter unit 3. Alternatively, the overcurrent protection unit 41 outputs, to the inverter unit 3, a signal that directly stops the switching operations of all the switching elements of the inverter unit 3, thereby stopping the output of the three-phase alternating-current voltage from the inverter unit 3 to the permanent-magnet motor 2.

The overcurrent protection requires the overcurrent protection unit 41 to perform a protection operation on the inverter unit 3 immediately before an instantaneous value of the motor current exceeds a limit value, in order to prevent the motor current from exceeding the limit value when the motor current flowing through the winding of the permanent-magnet motor 2 increases due to a factor such as load fluctuation or control disturbance. The overcurrent protection threshold Ilim is set for this purpose.

The above-described limit value needs to be set to a value that can prevent all phenomena which the inverter unit 3 or the permanent-magnet motor 2 may experience due to an overcurrent. These phenomena include a deterioration phenomenon such as dielectric breakdown due to heat generation when an overcurrent flows through the permanent-magnet motor 2, and element destruction of the switching elements of the inverter unit 3 due to an overcurrent.

The limit value is typically, a selected value which prevents occurrence of a phenomenon of possible overcurrent-caused phenomena, which phenomenon may occur due to a motor current having the smallest absolute value. The overcurrent protection threshold Ilim is set taking account of a margin relative to the limit value. In recent years, in many cases, a constraint due to irreversible demagnetization of the motor is strictest in considering the limit value because of, for example, an increase in the withstand voltage of a switching element, and critical design of a motor.

Figure 6:
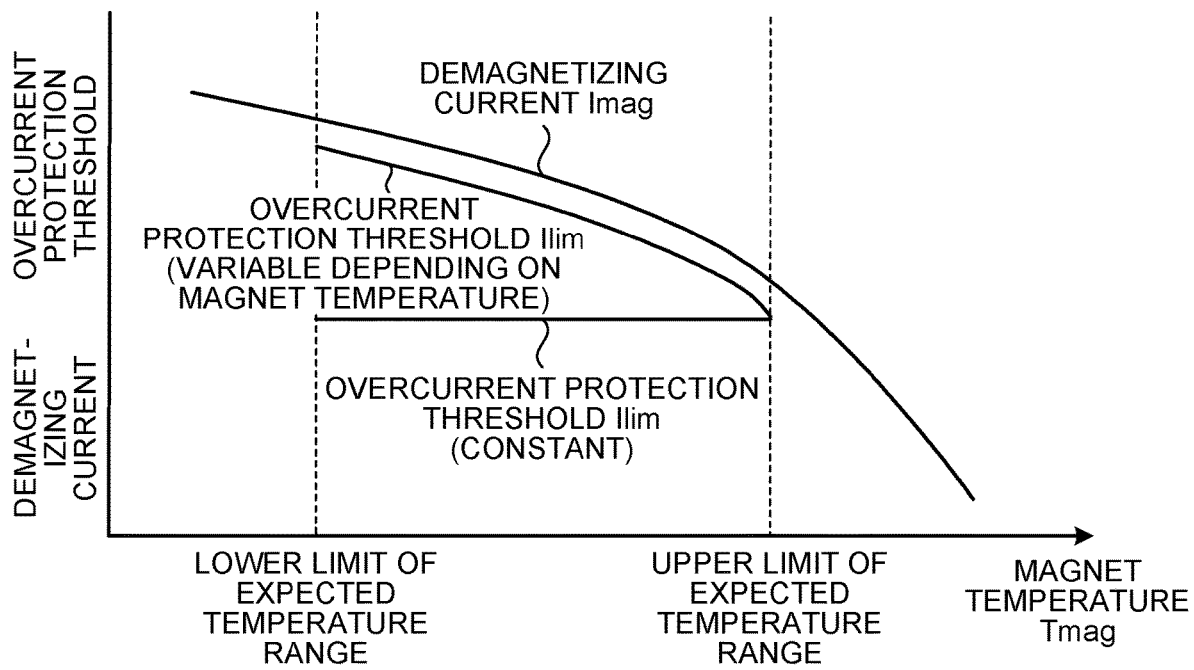
FIG. 6 is a diagram illustrating an example of a relationship among a magnet temperature, a demagnetizing current, and an overcurrent protection threshold according to the first embodiment.

FIG. 6 is a diagram illustrating an example of a relationship among the magnet temperature Tmag, a demagnetizing current Imag, and the overcurrent protection threshold Ilim according to the first embodiment. FIG. 6 is the diagram illustrating the example of the relationship among the magnet temperature Tmag, the demagnetizing current Imag, and the overcurrent protection threshold Ilim particularly in a case where an overcurrent protection function is designed on the basis of a constraint on a magnet of the permanent-magnet motor 2 in which the constraint due to the irreversible demagnetization of the motor is strictest. The diagram of FIG. 6 is for high-temperature demagnetization in which demagnetization occurs as temperature increases, but the following idea can similarly apply also to low-temperature demagnetization differing in that the gradient of the demagnetizing current Imag with respect to the magnet temperature Tmag tends to increase.

In the case where the magnet temperature Tmag of the permanent-magnet motor 2 is unknown, the overcurrent protection threshold Ilim is set as a constant value having a margin relative to a reference, or a demagnetizing current Imag that is minimum within an expected temperature range during operation of the permanent-magnet motor 2. In this case, the margin is excessive for the protection of the inverter in the temperature zone, specifically, in a low-temperature zone of FIG. 6 for the high-temperature demagnetization of FIG. 6. Such an excessive margin will limit the output performance of the permanent-magnet motor 2 more than necessary. In view of this, the magnet temperature estimation unit 42 estimates the magnet temperature Tmag through a method as described later, and the overcurrent protection unit 41 sets the overcurrent protection threshold Ilim to a value having a margin relative to the demagnetizing current Imag at the estimated magnet temperature Tmag. By changing the overcurrent protection threshold Ilim in correspondence to the magnet temperature Tmag, the overcurrent protection unit 41 can reduce an excess margin and extend the output performance of the permanent-magnet motor 2.

The overcurrent protection unit 41 intermittently compares the current detection value with the overcurrent protection threshold Ilim every control computation period $\Delta t$ to determine necessity of the protection operation. This means that the longer the control computation period $\Delta t$ is, the longer an interval between the determinations made by the overcurrent protection unit 41 is, which results in failure to perform the protection operation in time when a sudden change in the motor current occurs.

Figure 7:
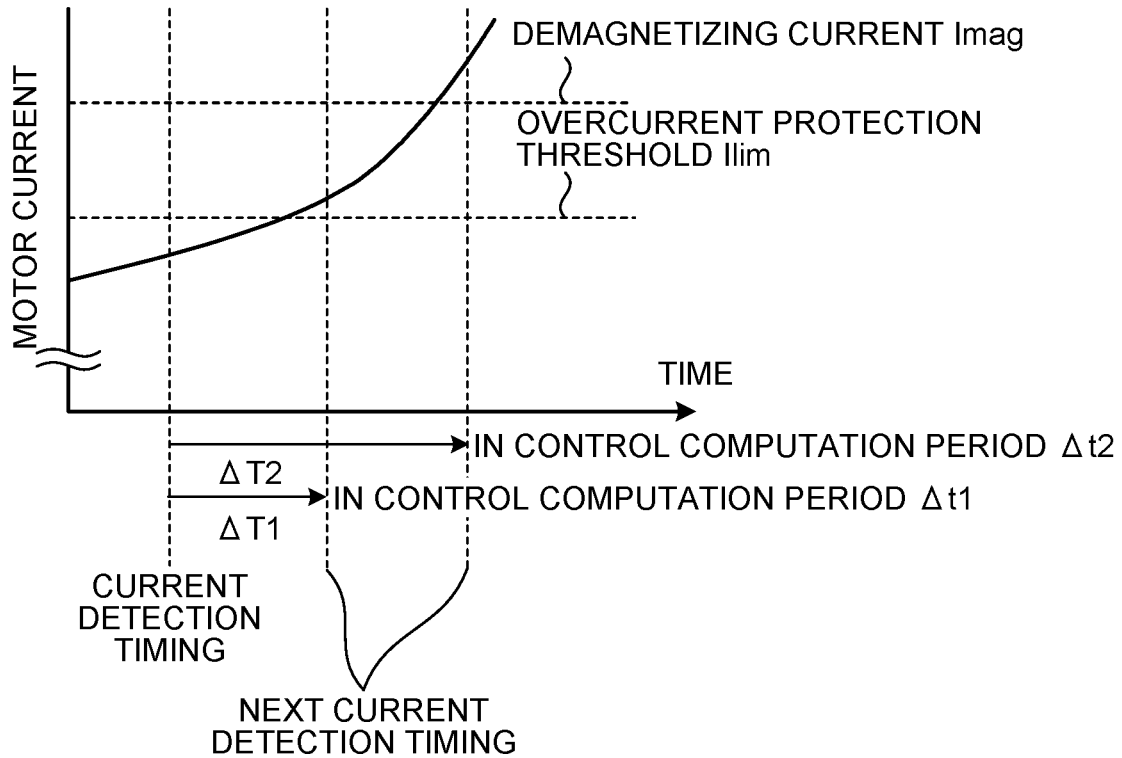
FIG. 7 is a diagram illustrating an influence of a difference in the control computation period of an overcurrent protection unit of the control unit according to the first embodiment on whether an overcurrent can be detected.

FIG. 7 is a diagram illustrating an influence of a difference in the control computation period $\Delta t$ of the overcurrent protection unit 41 of the control unit 4 according to the first embodiment on whether an overcurrent can be detected. In FIG. 7, on condition that the positive integer N, which is a parameter for setting the control computation period $\Delta t$, is constant, the control computation period $\Delta t$ is prolonged from a control computation period $\Delta t1$ to a control computation period $\Delta t2$ as the carrier frequency fc becomes lower, that is, a period of a carrier wave is prolonged. Note that the control computation period $\Delta t1$<the control computation period $\Delta t2$ holds true. The carrier frequency fc becoming lower means the output voltage frequency finv of the inverter unit 3 becoming lower in the synchronous PWM mode.

In the case of FIG. 7, when the permanent-magnet motor 2 changes as indicated by a thick solid line, a period from a certain current detection timing to the next current detection timing changes depending on the control computation period $\Delta t$. Therefore, when the control computation period $\Delta t$ is the control computation period $\Delta t1$, the overcurrent protection unit 41 can detect where a motor current exceeds the overcurrent protection threshold Ilim, and perform a protection operation on the inverter unit 3 before the motor current reaches the demagnetizing current Imag. On the other hand, when the control computation period $\Delta t$ is the lengthened control computation period $\Delta t2$, the motor current may exceed the demagnetizing current Imag at the next current detection timing of the overcurrent protection unit 41.

In summary, the different control computation periods are set in the case of the same current change in the permanent-magnet motor 2, but there is a difference between when the control computation period $\Delta t$ is the control computation period $\Delta t1$ and when the control computation period $\Delta t$ is the control computation period $\Delta t2$ as to whether the overcurrent protection unit 41 can detect the overcurrent before the motor current reaches the demagnetizing current Imag. As a result of performing the overcurrent protection operation on the basis of the same overcurrent protection threshold Ilim all the time, the overcurrent protection unit 41 can fail to operate when protection for the inverter unit 3 is necessary.

For this reason, the overcurrent protection unit 41 desirably sets a margin of the overcurrent protection threshold Ilim relative to and the demagnetizing current Imag, the margin being in proportion to the length of the control computation period $\Delta t$. A value of the overcurrent protection threshold Ilim is desirably set to be smaller as the control computation period $\Delta t$ is prolonged.

In addition, since the control computation period $\Delta t$ and the carrier frequency fc are desirably in an inversely proportional relationship as described above, the overcurrent protection unit 41 may set the value of the overcurrent protection threshold Ilim to be smaller as the carrier frequency fc decreases.

Furthermore, in a case where the synchronous PWM mode applies, it is desired that the output voltage frequency finv and the carrier frequency fc be in a proportional relationship and the control computation period $\Delta t$ and the carrier frequency fc be in an inversely proportional relationship. The overcurrent protection unit 41 may thus set the value of the overcurrent protection threshold Ilim to be smaller as the output voltage frequency finv decreases.

Figure 8:
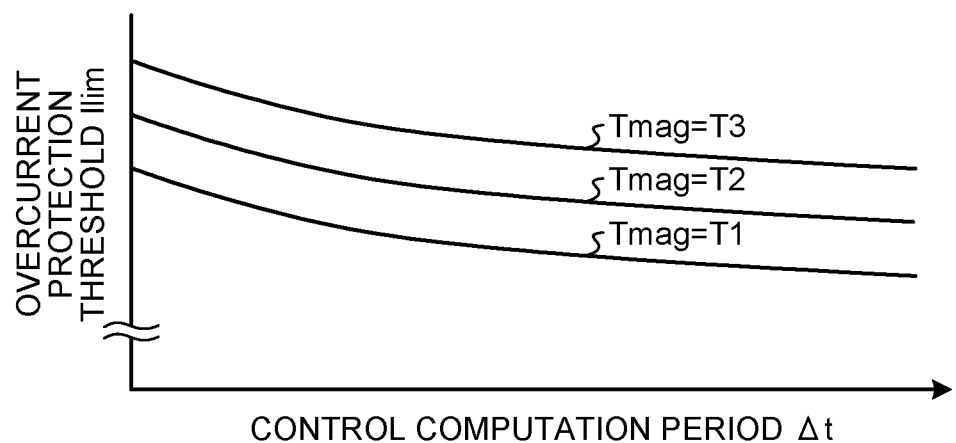
FIG. 8 is a conceptual diagram illustrating an example of a relationship between the control computation period and the overcurrent protection threshold according to the first embodiment.

FIG. 8 is a conceptual diagram illustrating an example of a relationship between the control computation period $\Delta t$ and the overcurrent protection threshold Ilim according to the first embodiment. Specifically, FIG. 8 illustrates the relationship between the control computation period $\Delta t$ and the overcurrent protection threshold Ilim at various magnet temperatures Tmag=T1, T2, and T3 in a case of high-temperature demagnetization. Assume that T1>T2>T3 holds true. The overcurrent protection unit 41 sets the relationship among the overcurrent protection threshold Ilim, the control computation period $\Delta t$, and the magnet temperature Tmag so that the overcurrent protection threshold Ilim relative to the control computation period $\Delta t$ decreases as the magnet temperature Tmag increases, as illustrated in FIG. 8. In practice, the overcurrent protection unit 41 stores the relationship between the control computation period $\Delta t$ and the overcurrent protection threshold Ilim under a plurality of magnet temperature Tmag conditions in the form of a table or a mathematical formula.

Figure 9:
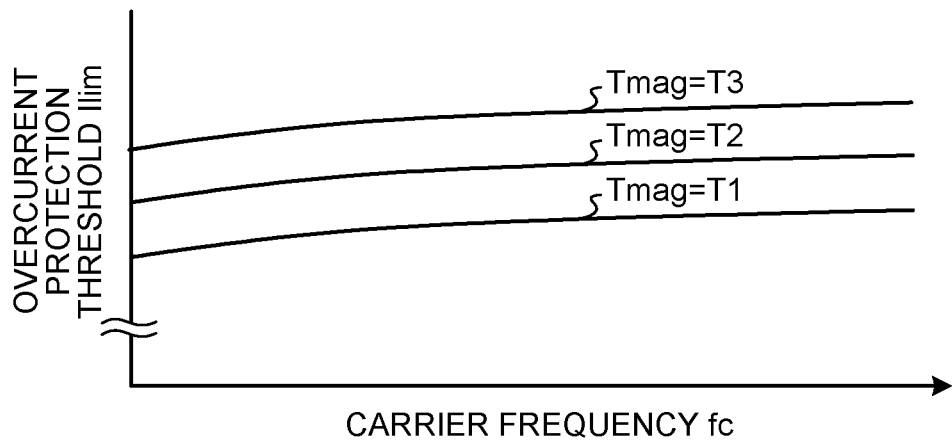
FIG. 9 is a conceptual diagram illustrating an example of a relationship between a carrier frequency and the overcurrent protection threshold according to the first embodiment.

FIG. 9 is a conceptual diagram illustrating an example of a relationship between the carrier frequency fc and the overcurrent protection threshold Ilim according to the first embodiment. The overcurrent protection unit 41 may set the relationship among the overcurrent protection threshold Ilim, the carrier frequency fc, and the magnet temperature Tmag so that the overcurrent protection threshold Ilim relative to the carrier frequency fc decreases as the magnet temperature Tmag increases, as illustrated in FIG. 9.

Figure 10:
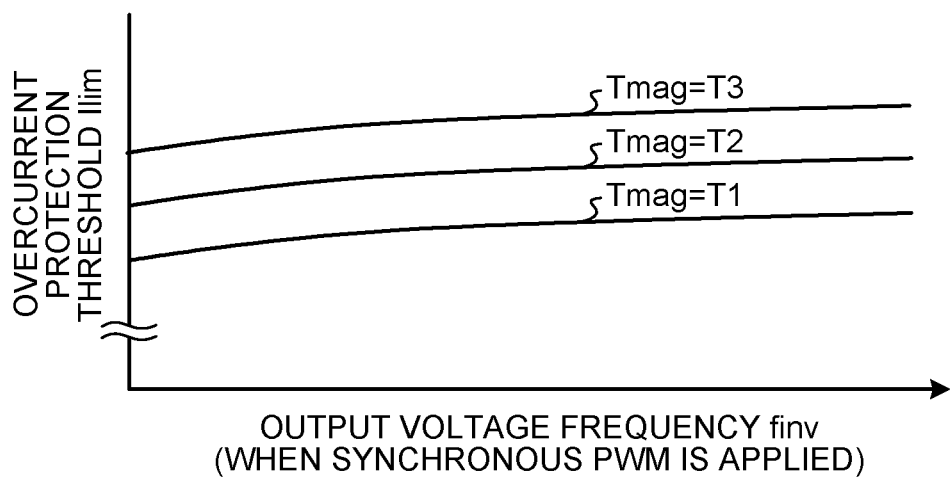
FIG. 10 is a conceptual diagram illustrating an example of a relationship between an output voltage frequency and the overcurrent protection threshold according to the first embodiment.

FIG. 10 is a conceptual diagram illustrating an example of a relationship between the output voltage frequency finv and the overcurrent protection threshold Ilim according to the first embodiment. FIG. 10 illustrates the relationship between the output voltage frequency finv and the overcurrent protection threshold Ilim in the case where the synchronous PWM mode applies. The overcurrent protection unit 41 may set the relationship among the overcurrent protection threshold Ilim, the output voltage frequency finv and the magnet temperature Tmag so that the overcurrent protection threshold Ilim relative to the output voltage frequency finv decreases as the magnet temperature Tmag increases, as illustrated in FIG. 10.

The overcurrent protection unit 41 may store the relationship between the magnet temperature Tmag and the overcurrent protection threshold Ilim as illustrated in FIG. 6 as a table of correction coefficients for performing correction by multiplication by a coefficient on the basis of the control computation period Δt, instead of tables or mathematical formulae indicating the relationships illustrated in FIGS. 8 to 10. The overcurrent protection unit 41 may store a relationship between the overcurrent protection threshold Ilim and the carrier frequency fc, which is a parameter related to setting the control computation period Δt, instead of the relationship between the overcurrent protection threshold Ilim and the control computation period Δt. Alternatively, the overcurrent protection unit 41 may store a relationship between the overcurrent protection threshold Ilim and the output voltage frequency finv of the inverter unit 3 in the synchronous PWM mode.

Consequently, in order to perform the protection operation on the inverter unit 3 appropriately regardless of the length of the control computation period Δt, the overcurrent protection unit 41 needs to change the overcurrent protection threshold Ilim in correspondence to the control computation period Δt, the carrier frequency fc that can be a parameter related to setting the control computation period Δt, or the output voltage frequency finv of the inverter unit 3 in the synchronous PWM mode. The overcurrent protection unit 41 sets the overcurrent protection threshold Ilim on the basis of the magnet temperature Tmag and any one of the control computation period Δt of the control unit 4, the output voltage frequency finv of the inverter unit 3, and the carrier frequency fc based on the output voltage frequency finv of the inverter unit 3. The magnet temperature Tmag is a magnet temperature estimated value of the permanent magnet of the permanent-magnet motor 2.

Next, an operation of the magnet temperature estimation unit 42 will be described. The magnet temperature estimation unit 42 estimates the magnet temperature Tmag of the permanent magnet of the permanent-magnet motor 2 on the basis of the three-phase alternating-current voltage output from the inverter unit 3 and the motor current flowing through the permanent-magnet motor 2. The magnet temperature estimation unit 42 can use a current value detected by the current detection unit 5 as the motor current necessary for estimating the magnet temperature Tmag. While the driving apparatus 100 requires a voltage sensor for detecting the three-phase alternating-current voltage, the three-phase alternating-current voltage output from the inverter unit 3 includes many harmonic components generated by the switching operations of the switching elements. For this reason, instead of using a detection value of the three-phase alternating-current voltage, the magnet temperature estimation unit 42 may use the voltage command of the control unit 4 on the basis of which the inverter unit 3 generates the three-phase alternating-current voltage. That is, the magnet temperature estimation unit 42 may estimate the magnet temperature Tmag on the basis of the voltage command and the motor current.

The magnet temperature estimation unit 42 may convert coordinates for the voltage command and the motor current into known rotating orthogonal two-axis coordinates, that is, d-q axis coordinates, and use values having been subjected to the coordinate conversion. By performing the coordinate conversion, the magnet temperature estimation unit 42 can handle an alternating-current amount including voltage, current, etc. as a direct-current amount, and can simplify an operation process.

A voltage output from the inverter unit 3 and a voltage generated in the permanent-magnet motor 2 are balanced with each other, under which condition the permanent-magnet motor 2 is driven. The voltage generated in the permanent-magnet motor 2 is a winding resistance voltage and an induced voltage. The winding resistance voltage is a voltage generated mainly by a flow of the motor current through the winding of the permanent-magnet motor 2. The induced voltage is a voltage generated in the winding of the permanent-magnet motor 2 under an action of the magnetic flux of the permanent-magnet motor 2 and the rotation of the permanent-magnet motor 2 itself. The magnetic flux of the permanent-magnet motor 2 is constituted by magnetic flux generated by a flow of the motor current through the winding of the permanent-magnet motor 2 and magnetic flux caused by the permanent magnet of the permanent-magnet motor 2.

Since the magnetic flux caused by the permanent magnet has a correlation with the magnet temperature Tmag, the correlation between the magnet temperature Tmag and the magnetic flux caused by the permanent magnet is obtained in advance from actual measurement, a data sheet of permanent magnet characteristics, or the like. The magnet temperature estimation unit 42 can estimate the magnet temperature Tmag of the permanent-magnet motor 2 by extracting a component related to the magnetic flux caused by the permanent magnet from the voltage generated in the permanent-magnet motor 2, that is, the voltage output from the inverter unit 3.

Among the winding resistance voltage and the induced voltage are components caused by the magnetic flux generated by a flow of the motor current through the winding of the permanent-magnet motor 2. These components can be calculated from the motor current, the rotational speed, and the like if a winding resistance value, inductance, and the like, which are parameters indicating the characteristics of the permanent-magnet motor 2, are known. The control unit 4 obtains the parameters indicating the characteristics of the permanent-magnet motor 2 through, for example, actual measurement, and subtracts those components from the voltage generated in the permanent-magnet motor 2, thereby extracting the component related to the magnetic flux caused by the permanent magnet.

Note that a more detailed configuration of the magnet temperature estimation unit 42 can be implemented by, for example, a configuration disclosed in Japanese Patent No. 5788057, and thus, will be omitted herein.

In the light of the above description, a series of operations of the driving apparatus 100 from startup thereof and start of driving of the permanent-magnet motor 2 to the protection operation performed on the inverter unit 3 will be described.

Figure 11:
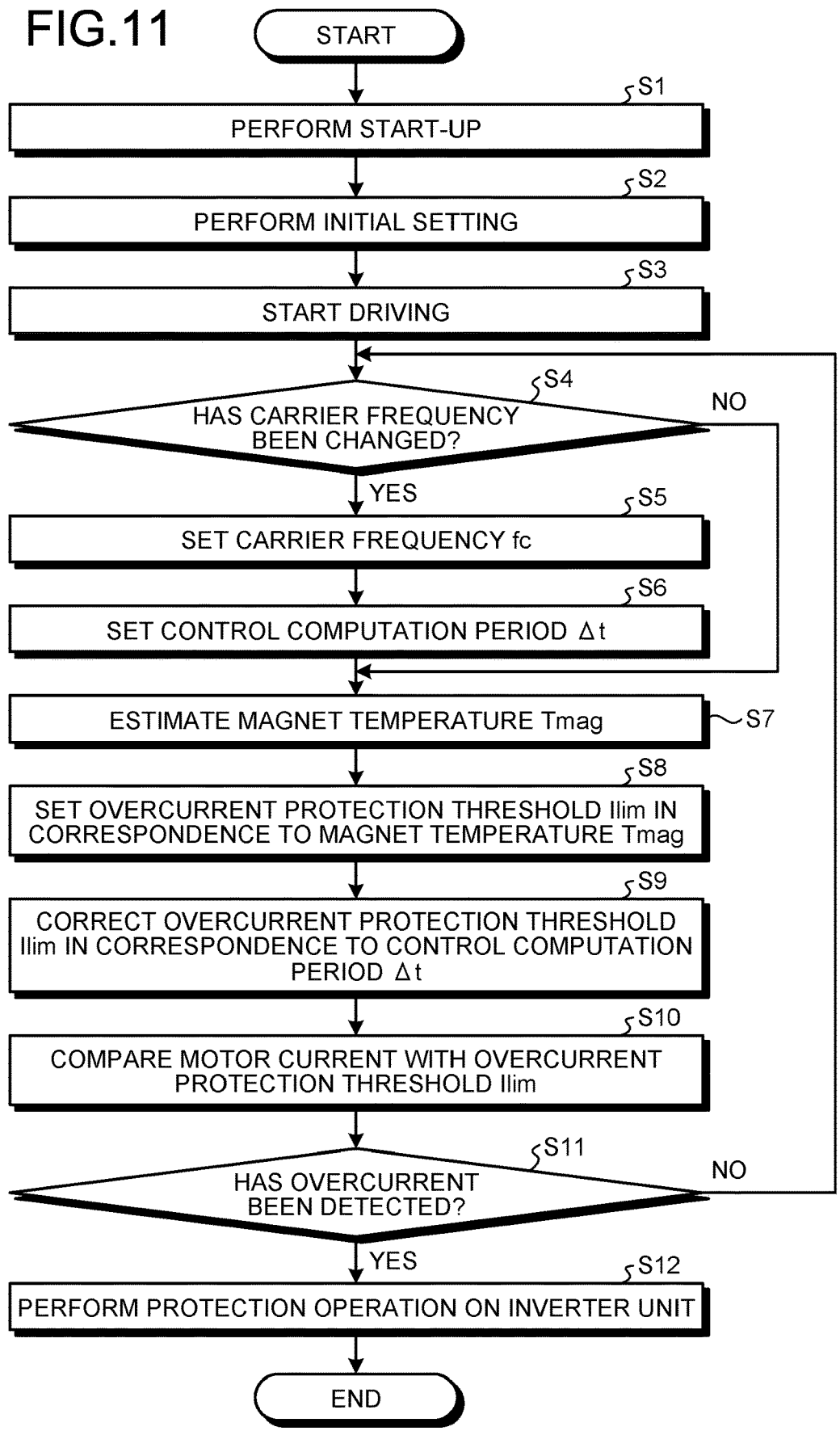
FIG. 11 is a flowchart illustrating operations of the driving apparatus according to the first embodiment from startup thereof and start of driving of the permanent-magnet motor to a protection operation performed on an inverter unit.

FIG. 11 is a flowchart illustrating operations of the driving apparatus 100 according to the first embodiment from startup thereof and start of driving of the permanent-magnet motor 2 to a protection operation performed on the inverter unit 3. These operations are mainly controlled by the control unit 4. First, the control unit 4 starts up the driving apparatus 100 (step S1) and performs initial setting (step S2). Specifically, the control unit 4 sets, as the initial setting, the control computation period Δt, the carrier frequency fc, the overcurrent protection threshold Ilim, and the like necessary for driving the permanent-magnet motor 2. The control unit 4 sets an appropriate value of the overcurrent protection threshold Ilim corresponding to the control computation period Δt as described above.

After the initial setting performed by the control unit 4, the inverter unit 3 controls an operation related to output of a voltage on the basis of the output voltage frequency finv set by the control unit 4, and starts driving the permanent-magnet motor 2 (step S3).

The control unit 4 determines whether the carrier frequency fc has been changed during driving of the permanent-magnet motor 2 (step S4). If the carrier frequency fc has been changed (step S4: Yes), the control unit 4 sets the carrier frequency fc to a desired value (step S5), and also sets the control computation period $\Delta t$ to an appropriate value corresponding to the carrier frequency fc (step S6). If the carrier frequency fc has not been changed (step S4: No), the control unit 4 skips the operations of steps S5 and S6.

In the control unit 4, the magnet temperature estimation unit 42 appropriately estimates the magnet temperature Tmag of the permanent-magnet motor 2 (step S7), and sets the overcurrent protection threshold Ilim in correspondence to the magnet temperature Tmag (step S8). Furthermore, the magnet temperature estimation unit 42 corrects the overcurrent protection threshold Ilim in correspondence to the control computation period $\Delta t$ (step S9). The temperature change in the magnet temperature Tmag of the permanent-magnet motor 2 is moderate relative to the change in the motor current. For this reason, the magnet temperature estimation unit 42 need not estimate the magnet temperature as frequently as current anomaly determination performed by the overcurrent protection unit 41. That is, the magnet temperature estimation unit 42 need not perform the magnet temperature estimation operation in the same period as the control computation period $\Delta t$. The magnet temperature estimation unit 42 may perform the magnet temperature estimation operation and the setting operation of the overcurrent protection threshold Ilim corresponding to the magnet temperature Tmag, at timings extracted from the timings of the control computation performed every control computation period $\Delta t$.

When the magnet temperature estimation unit 42 sets and corrects the overcurrent protection threshold Ilim, the overcurrent protection unit 41 compares the motor current flowing through the winding of the permanent-magnet motor 2 detected by the current detection unit 5, with the overcurrent protection threshold Ilim (step S10), and determines whether there is an anomaly in the output current. If the overcurrent has not been detected (step S11: No), the overcurrent protection unit 41 returns to the operation of step S4. If the overcurrent has been detected (step S11: Yes), the overcurrent protection unit 41 performs a protection operation on the inverter unit 3 (step S12).

By performing the protection operation on the inverter unit 3 in accordance with the flowchart illustrated in FIG. 11 as described above, the driving apparatus 100 can achieve the protection operation on the inverter unit 3 regardless of the magnitude of the carrier frequency fc and the length of the control computation period $\Delta t$, and can prevent demagnetization of the permanent magnet due to an overcurrent.

Figure 12:
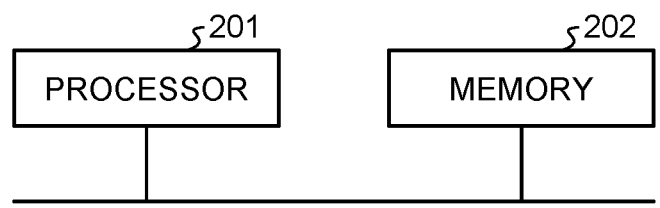
FIG. 12 is a diagram illustrating an example of a hardware configuration that realizes the control unit included in the driving apparatus according to the first embodiment.

Next, a hardware configuration of the control unit 4 included in the driving apparatus 100 will be described. FIG. 12 is a diagram illustrating an example of a hardware configuration that realizes the control unit 4 included in the driving apparatus 100 according to the first embodiment. The control unit 4 is realized by a processor 201 and a memory 202.

The processor 201 is a central processing unit (CPU, also referred to as a processing device, an arithmetic device, a microprocessor, a microcomputer, a processor, or a digital signal processor (DSP)), or system large scale integration (LSI). As the memory 202, a nonvolatile or volatile semiconductor memory such as a random access memory (RAM), a read only memory (ROM), a flash memory, an erasable programmable read only memory (EPROM), or an electrically erasable programmable read only memory (EEPROM (registered trademark)) can be exemplified. The memory 202 is not limited thereto, and may be a magnetic disk, an optical disk, a compact disc, a mini disk, or a digital versatile disc (DVD).

As described above, according to the first embodiment, the control unit 4 of the driving apparatus 100 sets the overcurrent protection threshold Ilim for the inverter unit 3 in correspondence to the control computation period $\Delta t$, or a parameter related to the control computation period $\Delta t$, for example, the carrier frequency fc, and the output voltage frequency finv of the inverter unit 3 in the synchronous PWM mode. Accordingly, the driving apparatus 100 achieves overcurrent protection of the inverter unit 3 regardless of the length of the control computation period $\Delta t$ set on the basis of the carrier frequency fc. As a result, the driving apparatus 100 provides an effect that it is possible to prevent element destruction of the switching elements of the inverter unit 3 and demagnetization of the permanent-magnet motor 2 connected to the inverter unit 3 due to an overcurrent.

In addition, since the driving apparatus 100 makes it possible to design a reduced margin relative to the demagnetizing current Imag, the output performance of the permanent-magnet motor 2 can be extended, and a permanent magnet having a lower demagnetization resistance can be used as a permanent magnet for the permanent-magnet motor 2. As a result, there is an effect that manufacturing cost of the permanent-magnet motor 2 can be reduced.

Furthermore, the driving apparatus 100 has a mode for setting the carrier frequency fc to M times the output voltage frequency finv of the inverter unit 3, that is, the synchronous PWM mode applies to the driving apparatus 100. Applying the synchronous PWM mode the driving apparatus 100 enables a maximum value of the output voltage frequency finv to be set higher than that in the asynchronous PWM mode. The driving apparatus 100 can perform driving even in a high speed zone where driving is difficult in the asynchronous PWM mode, and thus has an effect that appropriate overcurrent protection of the inverter unit 3 can be achieved even in the high speed zone.

Second Embodiment

In the first embodiment, the driving apparatus 100 performs the protection operation on the inverter unit 3, taking account of the magnet temperature Tmag of the permanent-magnet motor 2 on the basis of the control computation period $\Delta t$. A second embodiment shortens the control computation period $\Delta t$, that is, an overcurrent determination period in correspondence to the magnet temperature Tmag to thereby improve responsiveness to overcurrent protection under the condition that requires a more accurate protection operation because of, for example, high-temperature demagnetization, or the demagnetizing current Imag decreases with an increase in the temperature of the permanent-magnet motor 2. Differences from the first embodiment will be described.

Figure 13:
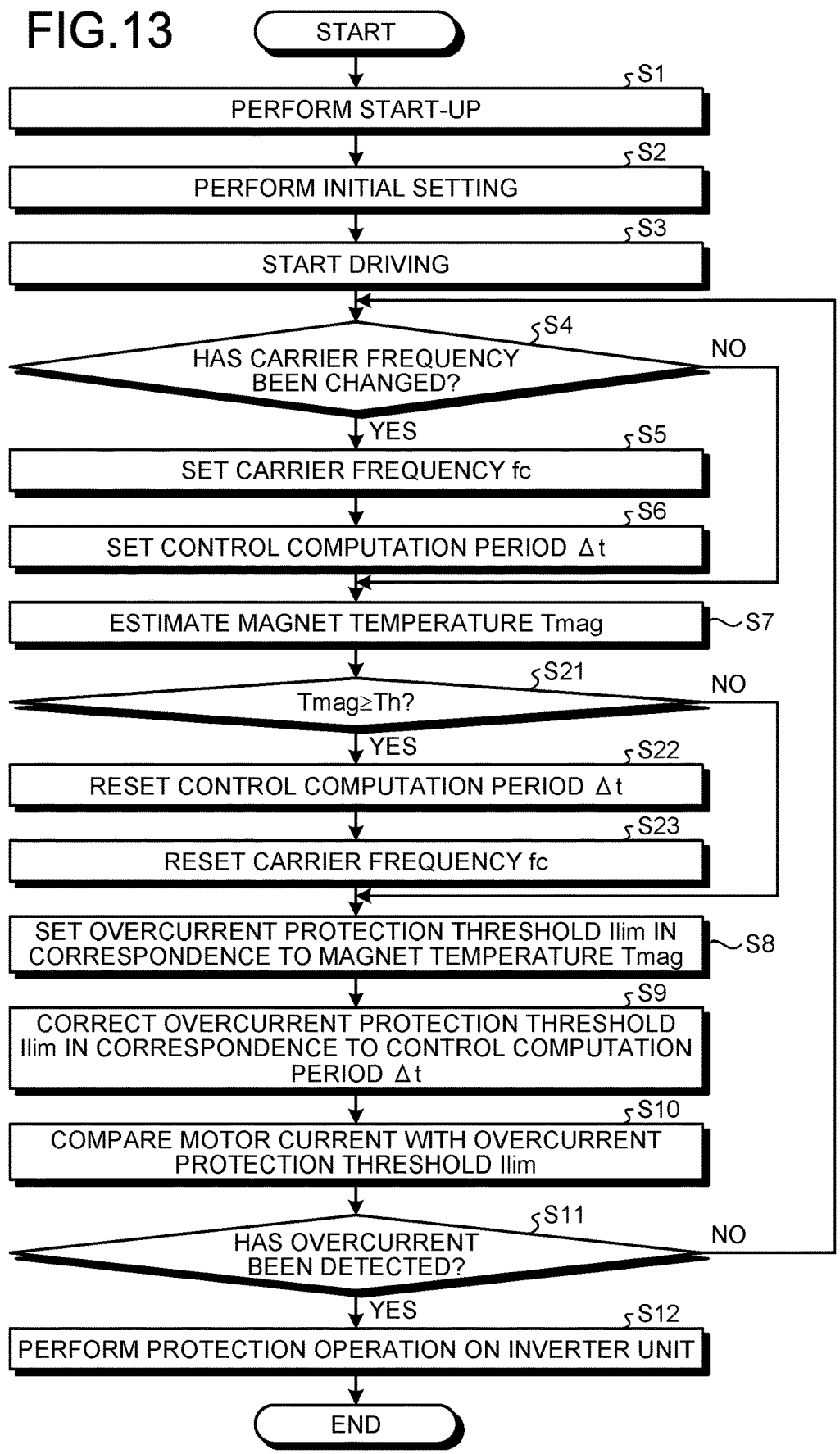
FIG. 13 is a flowchart illustrating operations of the driving apparatus according to a second embodiment from startup thereof and start of driving of the permanent-magnet motor to a protection operation performed on the inverter unit.

FIG. 13 is a flowchart illustrating operations of the driving apparatus 100 according to the second embodiment from startup thereof and start of driving of the permanent-magnet motor 2 to a protection operation performed on the inverter unit 3. These operations are mainly controlled by the control unit 4. In FIG. 13, the operations of steps S1 to S7 are similar to those in the flowchart of the first embodiment illustrated in FIG. 11.

The magnet temperature estimation unit 42 compares the estimated magnet temperature Tmag with a predetermined temperature threshold Th (step S21). If the estimated magnet temperature Tmag is equal to or higher than the temperature threshold Th (step S21: Yes), the magnet temperature estimation unit 42 resets the control computation period Δt, that is, the overcurrent determination period to be shorter in correspondence to the magnet temperature Tmag in order to improve the responsiveness to the overcurrent protection (step S22). That is, the magnet temperature estimation unit 42 sets the control computation period Δt on the basis of the magnet temperature Tmag which is a magnet temperature estimated value. A constraint on the shortest time of the control computation period Δt arises from the above-described upper limit of the setting of the carrier frequency fc and a constraint on a process of the control computation performed by the processor. Under such a constraint, the magnet temperature estimation unit 42 resets the carrier frequency fc (step S23). That is, the magnet temperature estimation unit 42 sets the carrier frequency fc on the basis of the output voltage frequency finv of the inverter unit 3 and the control computation period Δt set on the basis of the magnet temperature Tmag which is a magnet temperature estimated value.

To reset the carrier frequency fc, specifically, the magnet temperature estimation unit 42 selects the PWM mode from among the asynchronous PWM mode and the synchronous PWM mode on the basis of the magnitude of the output voltage frequency finv and selects the above-described parameters, or positive integers M and N, provided that the constraint of fc/finv≥9 is substantially satisfied when the asynchronous PWM mode applies, as the control computation period Δt and the carrier frequency fc have a correlation as described above. If the estimated magnet temperature Tmag is less than the temperature threshold Th (step S21: No), the magnet temperature estimation unit 42 skips the operations of steps S22 and S23. The operations of subsequent steps S8 to S12 are similar to those in the flowchart of the first embodiment illustrated in FIG. 11.

As described above, according to the second embodiment, the driving apparatus 100 performs the protection operation on the inverter unit 3 in accordance with the flowchart illustrated in FIG. 13. Accordingly, the driving apparatus 100 shortens the control computation period Δt, that is, the overcurrent determination period in correspondence to the magnet temperature Tmag to thereby improve responsiveness to overcurrent protection under the condition that requires a more accurate protection operation because the demagnetizing current Imag decreases with the increase in the temperature of the permanent-magnet motor 2. As a result, the driving apparatus 100 can more reliably prevent demagnetization of the permanent magnet due to an overcurrent.

Third Embodiment

To perform the protection operation for the inverter unit 3, in the first embodiment, the overcurrent protection unit 41 outputs, to the inverter unit 3, a signal that stops all the outputs of the PWM signals of the individual phases, which are drive signals for the inverter unit 3, or a signal that directly stops the switching operations of all the switching elements of the inverter unit 3, thereby stopping the output of the three-phase alternating-current voltage from the inverter unit 3 to the permanent-magnet motor 2.

To perform the protection operation on the inverter unit 3, in a third embodiment, the overcurrent protection unit 41 reduces the output voltage frequency finv of the three-phase alternating-current voltage output from the inverter unit 3 in order to continue the operation of the permanent-magnet motor 2. The overcurrent protection unit 41 reduces power output from the inverter unit 3 to the permanent-magnet motor 2, thereby performing the protection operation on the inverter unit 3.

The protection operation of the third embodiment is the same as that in the first embodiment in the operation involved in the overcurrent protection unit 41 determining the anomaly of the output current. It is noted that a drive constraint under which to perform the protection operation in the third embodiment is more moderate than a drive constraint under which to stop the supply of the three-phase alternating-current voltage from the inverter unit 3 to the permanent-magnet motor 2 in the first embodiment. It is therefore desirable to set a condition under which the output current is more likely to be determined as anomaly than under a condition in the first embodiment. For example, the third embodiment sets the overcurrent protection threshold Ilim to a value smaller than a set value in the first embodiment.

To operate the protection operation on the inverter unit 3, for example, the overcurrent protection unit 41 controls the control unit 4 such that an absolute value of the output voltage frequency finv of the inverter unit 3 is reduced by a frequency reduction amount Δf. That is, assuming that the output voltage frequency finv, which is set as a target value, before a reducing action based on the frequency reduction amount Δf is denoted by finv0, a relationship of finv=finv0+Δf holds true, where Δf<0 if finv0>0, and Δf>0 if finv0<0. It is noted that |finv0| is set to be larger than |Δf| so that signs of finv and finv0 are not inverted between before and after the reducing action. The overcurrent protection unit 41 obtains the frequency reduction amount Δf on the basis of a proportional value corresponding to the excess of the output current with respect to the overcurrent protection threshold Ilim compared in the determination of the anomaly of the output current, and an integration value of the excesses for each control computation period Δt.

While, in the third embodiment, a deviation occurs in the output voltage frequency finv of the inverter unit 3 with respect to a desired frequency, that is, a target value, and a speed deviation occurs in the permanent-magnet motor 2, the operating state of the permanent-magnet motor 2 is continued unlike the stop of the supply of the three-phase alternating-current voltage from the inverter unit 3.

As described above, according to the third embodiment, the driving apparatus 100 has an effect that it is possible to achieve protection of the permanent-magnet motor 2, while continuing driving the permanent-magnet motor 2.

Fourth Embodiment

In a fourth embodiment, an example will be described in which the driving apparatus 100 described in the first to third embodiments is applied to an air-conditioning apparatus. By applying the driving apparatus 100 to an air-conditioning apparatus, it is possible to constitute an air-conditioning apparatus using a compressor that uses a rotational force of the permanent-magnet motor 2 as a drive source, and cooling and heating capacity can be improved with the extension of an operation limit.

Figure 14:
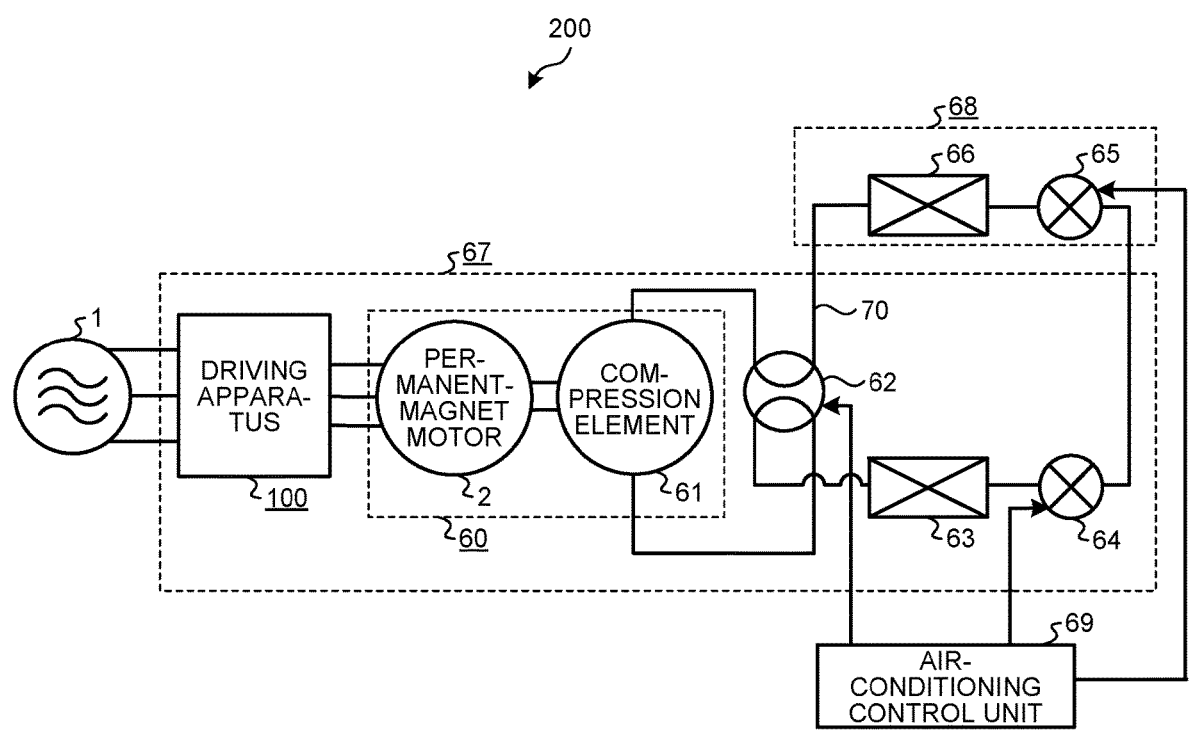
FIG. 14 is a diagram illustrating an example configuration of an air-conditioning apparatus according to a fourth embodiment.

FIG. 14 is a diagram illustrating an example configuration of an air-conditioning apparatus 200 according to the fourth embodiment. The air-conditioning apparatus 200 includes the driving apparatus 100 and a compressor 60 using the permanent-magnet motor 2 as a drive source. In the air-conditioning apparatus 200, a refrigerant circuit is constituted in which a refrigerant pipe 70 connects the compressor 60, a four-way valve 62, a heat source-side heat exchanger 63, a heat source-side expansion valve 64, a load-side expansion valve 65, a load-side heat exchanger 66, the four-way valve 62, and the compressor 60 in this order. In the air-conditioning apparatus 200, a refrigeration cycle is established by refrigerant flowing in the refrigerant circuit. Although not illustrated in FIG. 14, an accumulator that stores excess refrigerant may be provided on a suction side of the compressor 60. In controlling the refrigerant circuit, an air-conditioning control unit 69 controls the four-way valve 62, the heat source-side expansion valve 64, and the load-side expansion valve 65. The configuration of the refrigeration cycle of the air-conditioning apparatus 200 illustrated in FIG. 14 is merely an example, and the refrigeration cycle does not necessarily have the same configuration.

Next, an operation of the air-conditioning apparatus 200 will be described using a cooling operation as an example. Although a detailed description of a heating operation will be omitted, the air-conditioning apparatus 200 can also realize the heating operation by performing switching of flow paths in the four-way valve 62. In the cooling operation, the air-conditioning apparatus 200 performs switching of the flow paths to adjust a direction of the four-way valve 62 so that refrigerant discharged in advance from the compressor 60 is directed to the heat source-side heat exchanger 63 and refrigerant flowing out of the load-side heat exchanger 66 is directed to the compressor 60.

By the driving apparatus 100 driving the permanent-magnet motor 2, a compression element 61 coupled to the permanent-magnet motor 2 compresses the refrigerant into high-temperature and high-pressure refrigerant, and the compressor 60 discharges the high-temperature and high-pressure refrigerant. That is, the compressor 60 compresses the refrigerant in the refrigeration cycle. The high-temperature and high-pressure refrigerant discharged from the compressor 60 flows into the heat source-side heat exchanger 63 via the four-way valve 62, and exchanges heat with external air to radiate heat in the heat source-side heat exchanger 63. The refrigerant flowing out of the heat source-side heat exchanger 63 is subjected to expansion and pressure reduction in the heat source-side expansion valve 64 to change into low-temperature and low-pressure gas-liquid two-phase refrigerant. The refrigerant in such a state is subjected to expansion and pressure reduction in the load-side expansion valve 65, flows into the load-side heat exchanger 66, exchanges heat with air in a space to be air-conditioned to be evaporated, changes into low-temperature and low-pressure refrigerant, and flows out of the load-side heat exchanger 66. The refrigerant flowing out of the load-side heat exchanger 66 is sucked into the compressor 60 via the four-way valve 62, and is compressed again. In the air-conditioning apparatus 200, the above operations are repeated.

For the purpose of mainly cooling the inverter unit 3 of the driving apparatus 100, a cooling plate may be brought into contact with a power module which is a component of the inverter unit 3, and the refrigerant pipe 70 may be further brought into contact with the cooling plate to cause the refrigerant flowing in the refrigerant pipe 70 to absorb heat generated in the inverter unit 3. With the above arrangement, a temperature increase in the inverter unit 3 can be efficiently reduced.

In the configuration of FIG. 14, both of the heat source-side expansion valve 64 on the outdoor unit 67 side and the load-side expansion valve 65 on the indoor unit 68 side are included. The configuration is employed in order to make it possible to control the cooling capacity of the driving apparatus 100 independently by each of the two expansion valves, i.e., the heat source-side expansion valve 64 and the load-side expansion valve 65. With such a configuration, the air-conditioning apparatus 200 is suitable for finely controlling the refrigerant so as to adjust the temperature of the inverter unit 3 to a desired temperature while detecting the temperature, and the temperature of the driving apparatus 100, in particular, the temperature of the power module which is a component of the inverter unit 3 is not lowered unnecessarily, so that the generation of dew condensation can be reduced, and the temperature can be controlled so as not to increase. The configuration of FIG. 14 is merely an example of finely controlling the temperature of the driving apparatus 100, and both of the two expansion valves, i.e., the heat source-side expansion valve 64 and the load-side expansion valve 65 may not be necessarily included. Either the heat source-side expansion valve 64 on the outdoor unit 67 side or the load-side expansion valve 65 on the indoor unit 68 side may be included.

In the fourth embodiment, the example has been described in which the driving apparatus 100 is applied to the air-conditioning apparatus 200, but there is no limitation thereto, and the driving apparatus 100 can be applied to a device including a refrigeration cycle such as a heat pump device and a refrigeration device, in addition to the air-conditioning apparatus 200.

Under a situation that requires the heating operation of the air-conditioning apparatus 200 at the low ambient temperature with the low temperature of the permanent magnet of the permanent-magnet motor 2 in the case of high-temperature demagnetization, the design margin with respect to the demagnetizing current Imag is reduced and the overcurrent protection threshold Ilim is increased to increase a current that can flow through the permanent-magnet motor 2, thereby improving the heating capacity and improving comfortability.

The driving apparatus 100 of the air-conditioning apparatus 200 performs, particularly during heating operation, an operation of estimating the magnet temperature Tmag of the permanent magnet of the permanent-magnet motor 2, and an operation of setting the overcurrent protection threshold Ilim on the basis of the magnet temperature estimated value of the permanent-magnet motor 2 and any one of the control computation period Δt of the control unit 4, the output voltage frequency finv of the inverter unit 3, and the carrier frequency fc based on the output voltage frequency finv of the inverter unit 3. Accordingly, the air-conditioning apparatus 200 can further enhance the effect of the present invention.

As described above, according to the fourth embodiment, the application of the driving apparatus 100 to the air-conditioning apparatus 200 can extend the operation limit of the permanent-magnet motor 2 which is a drive source of the compressor 60. In particular, when a permanent magnet having a characteristic of the high-temperature demagnetization is used as the permanent magnet of the permanent-magnet motor 2, the demagnetizing current Imag of the permanent magnet increases at a low temperature requiring a large heating capacity, and thus the current that can flow through the permanent-magnet motor 2 increases, so that there is an effect of improving the heating capacity at a low temperature.

Examples of utilization of the driving apparatus 100 include a refrigerator, a dehumidifier, a heat pump water heater, a heat pump drying/washing machine, and a refrigeration device in addition to the air-conditioning apparatus 200 equipped with the compressor 60 using the rotational force of the permanent-magnet motor 2 as a driving force. Furthermore, the driving apparatus 100 is also applicable to a product not equipped with a compressor, such as a dryer, a washing machine, or a vacuum cleaner, which obtains a driving force by the rotational force of the permanent-magnet motor 2, and is also applicable to a fan motor and the like.

The configurations described in the embodiments above are merely examples of the content of the present invention and can be combined with other known technology and part thereof can be omitted or modified without departing from the gist of the present invention.

The invention claimed is:

1. A driving apparatus comprising:
an inverter generating a three-phase alternating-current voltage from a direct-current voltage in accordance with a drive signal based on a voltage command and outputting the three-phase alternating-current voltage to a permanent-magnet motor, the permanent-magnet motor comprising a permanent magnet;
a current detector detecting a motor current flowing through the permanent-magnet motor; and
a controller generating the voltage command to control an operation of the inverter and estimating a temperature of the permanent magnet to perform a protection operation on the inverter on a basis of the motor current and an overcurrent protection threshold, wherein
the controller sets the overcurrent protection threshold on a basis of a magnet temperature estimated value of the permanent magnet and any one of a control computation period of the controller, an output voltage frequency of the inverter, and a carrier frequency based on the output voltage frequency of the inverter,
the controller sets the control computation period on a basis of the magnet temperature estimated value, and
the controller sets the carrier frequency on a basis of the output voltage frequency of the inverter and the control computation period set on a basis of the magnet temperature estimated value.

2. The driving apparatus according to claim 1, wherein the controller estimates the magnet temperature estimated value on a basis of the voltage command and the motor current.

3. The driving apparatus depending on claim 1, wherein the controller sets the control computation period in correspondence to a change in the carrier frequency.

4. The driving apparatus according to claim 1, wherein the controller sets the control computation period to a positive integral multiple of a half of the carrier frequency.

5. The driving apparatus according to claim 1, wherein the controller sets the carrier frequency to a constant value or to a positive integral multiple of the output voltage frequency of the inverter.

6. The driving apparatus according to claim 1, wherein the controller control unit stops output of the three-phase alternating-current voltage from the inverter as the protection operation on the inverter.

7. The driving apparatus according to claim 1, wherein the controller control unit reduces the output voltage frequency of the three-phase alternating-current voltage output from the inverter as the protection operation on the inverter.

8. An air-conditioning apparatus comprising:
the driving apparatus according to claim 1; and
a compressor using the permanent-magnet motor as a drive source, wherein the compressor compresses refrigerant in a refrigeration cycle.

9. The air-conditioning apparatus according to claim 8, wherein the driving apparatus performs, during heating operation, an operation of estimating the temperature of the permanent magnet of the permanent-magnet motor and sets the overcurrent protection threshold used in the protection operation on the inverter that outputs the three-phase alternating-current voltage to the permanent-magnet motor.

* * * * *